United States Patent [19]

Yada et al.

[11] Patent Number: 5,013,083
[45] Date of Patent: May 7, 1991

[54] ROOF MOLDING FOR USE WITH AUTOMOBILE AND CLIPS FOR SECURING THE SAME

[75] Inventors: Yukihiko Yada, Nagoya; Toshio Hirose, Handa, both of Japan

[73] Assignee: Tokai Kogyo Kabushiki Kaisha, Obu, Japan

[21] Appl. No.: 553,338

[22] Filed: Jul. 17, 1990

[30] Foreign Application Priority Data

Jul. 25, 1989 [JP] Japan .................................... 1-87201

[51] Int. Cl.⁵ ............................................. B60D 25/06
[52] U.S. Cl. ..................................... 296/213; 296/210
[58] Field of Search ................... 296/210, 213; 428/31

[56] References Cited

U.S. PATENT DOCUMENTS

| | | | |
|---|---|---|---|
| 3,711,147 | 1/1973 | Higuchi et al. | 296/213 X |
| 4,304,435 | 12/1981 | Everts et al. | 296/213 |
| 4,410,211 | 10/1983 | Kloppe et al. | 296/213 |
| 4,417,762 | 11/1983 | Imai et al. | 296/213 X |
| 4,444,428 | 4/1984 | Iwakura et al. | 296/213 X |
| 4,618,181 | 10/1986 | Tokuda et al. | 296/213 X |
| 4,634,173 | 1/1987 | Aonuma et al. | 296/188 |
| 4,792,180 | 12/1988 | Jacobsen et al. | 296/213 X |
| 4,834,448 | 5/1989 | Sakamoto et al. | 296/210 |
| 4,883,310 | 11/1989 | Miyazaki et al. | 296/210 |
| 4,930,279 | 5/1990 | Bart et al. | 296/213 X |

Primary Examiner—Margaret A. Focarino
Assistant Examiner—Joseph D. Pape
Attorney, Agent, or Firm—Dennison, Meserole, Pollack & Scheiner

[57] ABSTRACT

A roof molding including a base member having clip engaging surfaces at both ends thereof, and clips secured to the clip engaging surfaces of the base member. The clip includes a main body fixedly engageable with the clip engaging surfaces of the base member and an engaging strip engageable with an existing member positioned in a groove formed on an automobile roof. When the molding is installed into the groove, the engaging strip of the clip is engaged with the existing member positioned in the groove to secure the molding therein.

8 Claims, 4 Drawing Sheets

ROOF MOLDING FOR USE WITH AUTOMOBILE AND CLIPS FOR SECURING THE SAME

BACKGROUND OF THE INVENTION

The present invention relates to a roof molding for use with an automobile and clips for securing the end portions of the same, and more particularly, the invention relates to a roof molding which may be fixedly supported in a fitting groove formed on the automobile roof, and to clips which are engageable with existing members in the fitting groove to secure the end portions of the roof molding therein.

FIG. 8 shows one of the prior art roof molding for use with an automobile. As shown therein, a roof molding 31 comprises a base member 33 including a metal strip or a metal sheet 32 as a reinforcement member and a resin layer 30 formed of a hard resin, and an outer shell member 36 formed of a soft resin and encapsulating the base member 33 therein. The outer shell member 36 has an ornamental surface 34 and a pair of resilient leg portions or lips 35. The roof molding 31 thus constructed is installed into a fitting groove 55 formed along a joint line 56 joining a roof panel 52 to a roof side panel 53 of an automobile roof; the roof molding 31 is supported in the fitting groove 55 through biasing force of the resilient lips 35 against the side wall of the fitting groove 55.

FIG. 9 and 10 show another prior art roof molding. As shown therein, a roof molding 37 comprises a channel shaped reinforcement member 41 having a pair of engagement strips 40 integrally formed thereto, and an outer shell member 60 provided on the outer surface of the reinforcement member 41. The outer shell member 60 has an ornamental surface 38 and a pair of resilient leg portions 39. The roof molding 37 thus constructed is installed into a fitting groove 65 formed along a joint line joining a roof panel 62 to a roof side panel 63 of an automobile roof. As shown in FIG. 9, the fitting groove 65 is provides with a plurality of pairs of clips 43 secured to a support plate 42 which is laid on the bottom surface of the fitting groove 65 and is secured therein through engagement of studs 44 welded on the bottom surface of the fitting groove 65 with openings 45 formed on the support plate 42. When the leg portions 39 of the roof molding 37 are inserted into the fitting groove 65, the pair of clips 43 are deflected relative to each other to permit engagement of the engagement strips 40 with projected portions 43A formed on the clips 43, whereby the roof molding 37 are fixedly supported in the fitting groove 65 (FIG. 10).

A problem usually associated with the roof molding in the prior art is that since the roof molding 31 is secured to the fitting groove only through the biasing force of the resilient lips 35, the roof molding 31 tends to be disengaged from the fitting groove.

Another problem usually associated with the roof molding in the prior art is that since the roof molding 37 needs a fitting groove which has a sufficient transverse space for permitting deflection of the clips 43 and which has a sufficient depth for receiving the studs 44 therein, such a roof molding 37 can not be adapted to the fitting groove which does not have a width for permitting deflection of the clips 43 and a depth sufficient to receive the studs 44.

SUMMARY OF THE INVENTION

It is an object of the invention to provide a roof molding for use with an automobile and clips for securing the same in which the problem associated with the conventional roof molding, that is, to provide a roof molding which may be secured in the fitting groove without using special members such as studs, and to provide clips to secure the end portions of the roof molding to the fitting groove.

According to the present invention, there is provided a roof molding which includes a top member, a base member formed on the lower surface of the top member, the base member having a reinforcement member embedded therein and having flanged portions formed on both sides thereof, resilient leg members connected to the base member, the leg members being transversely oppositely projected relative to each other and being cut away at the both end portions of the base member to form clip engaging surfaces thereon, and clips secured to the clip engaging surfaces of the base member.

Also, according to the present invention, there is provided a clip which includes a main body having a plurality of projections, and an engaging strip formed on the main body and extending outwardly therefrom.

An important feature of the present invention is that the base member of the roof molding has the clips secured to the clip engaging surfaces at the both end portions thereof and are provided with leg members except for the both end portions thereof, thereby offering the advantage that the roof molding is supported in the groove through the biasing force of the leg members against the side wall of the groove and is secured in the groove at the end portions thereof through engagement of the clips with the existing members positioned in the groove. Therefore, the roof molding will not be easily disengaged from the groove.

Another feature of the invention is that since the clip may be engageable with the desired existing member such as a window molding positioned in the groove, it does not require to provide a special member such as a stud in the groove, and therefore, the clip is adaptable to the groove which does not have a sufficient width and depth.

The present invention will become more fully apparent from the claims and the description as it proceeds in connection with the drawings.

DETAILED DESCRIPTION OF THE PREFERRED EMBODIMENTS

Referring now to FIGS. 1 to 7, shown therein is a roof molding 7 and a clip 14 according to an embodiment of the invention which are applicable to a roof of an automobile.

Figure 7:
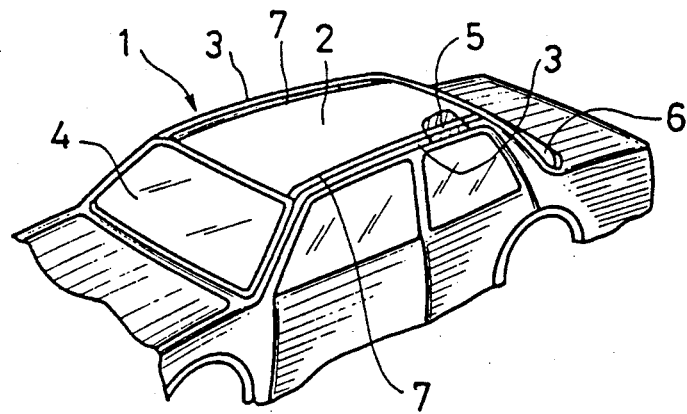
FIG. 7 is a schematic illustration of an automobile mounted with the roof molding.

As shown in FIG. 7, a roof of an automobile 1 comprises typically a roof panel 2 and a pair of roof side panels 3 in which grooves 5 (only one is shown in FIG. 7) are formed along joint lines joining the roof panel 2 to the roof side panels 3 so as to extend substantially from a front window shield 4 to a rear window shield 6. As will be appreciated, a roof molding 7 of the present invention is used to cover the groove 5.

Figure 1:
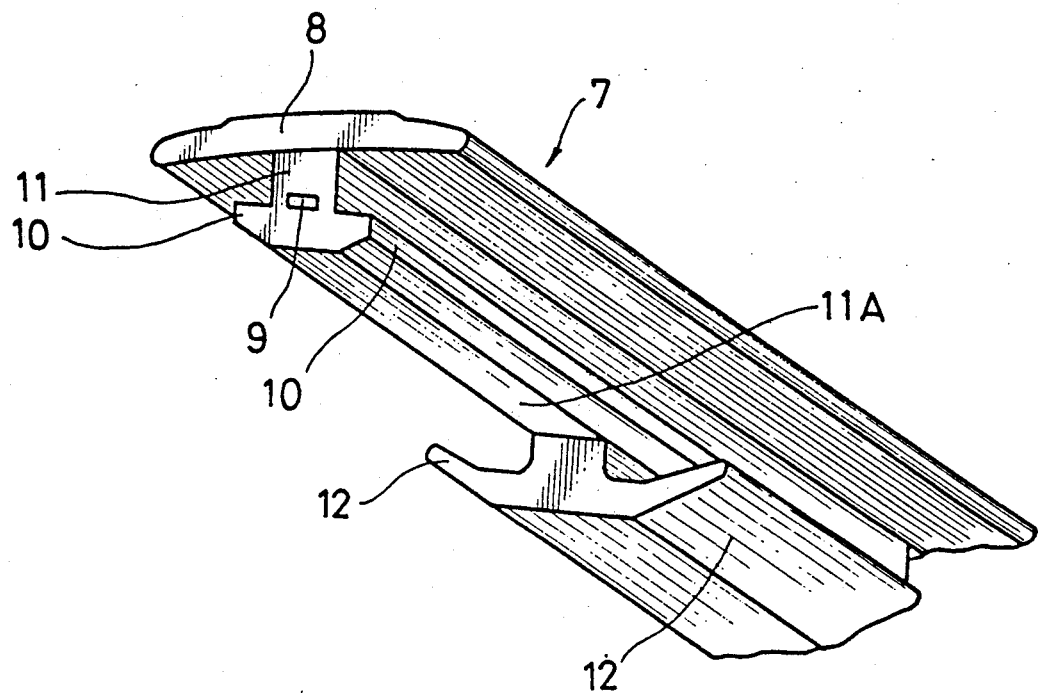
FIG. 1 is a perspective view of a roof molding according to an embodiment of the present invention.

As shown in FIG. 1, the roof molding 7 comprises a top member 8 for covering the groove 5, a base member 11 bonded to the lower surface of the top member 8 and having flanged portions 10 integrally formed on both sides thereof, and resilient leg member 12 bonded to the lower surface of the base member 11. Although the leg members 12, in this embodiment, are bonded to the lower surface of the base member 11, the leg members 12 may be bonded to both sides of the base member 11, if desired.

The top member 8 is formed of hard resin or soft resin having a desired flexibility and has sufficient length and width to cover an opening of the groove 5. The base member 11 is longitudinally embedded with a flexible metal reinforcement member 9 to impart a desired flexibility and rigidity thereto. As described above, the base member 11 has the flanged portions 10 integrally formed on both sides thereof, thereby providing an inverted T-shaped configuration in cross section. The leg members 12 are made of soft resin and extend substantially over the entire length of the base member 11 except for the both end portions thereof. The leg members 12 transversely oppositely extend relative to each other so as to contact the side walls of the groove 5 when the roof molding 7 is installed into the goove 5. It is to be noted that the exposed lower surface of the end portions of the base member 11 act as clip engaging surfaces 11A for clips which will be described hereinafter. The top member 8, the base member 11 and the leg member 12 are preferably simultaneously formed by an extruding operation. The reinforcement member 9 is preferably embedded to the base member 11 during the extruding operation. It will be appreciated that the roof molding 7 as constructed above is three dimensionally freely benable, thereby permitting complete insertion of the roof molding 7 into the groove 5.

Figure 2:
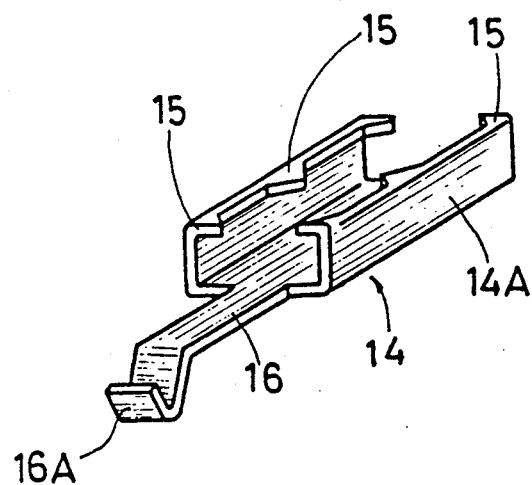
FIG. 2 is a perspective view of a clip to secure the roof molding.

As shown in FIG. 2, a clip 14 for securing the end portion of the roof molding 7 is made of a metal sheet and mainly comprises a main body 14A having a channel shaped configuration. The main body 14A is integrally provided with a plurality of projections 15 which inwardly oppositely project from the longitudinal upper edges thereof. The main body 14A is also integrally provided with an engaging strip 16 which forwardly projects from the bottom wall thereof and has an engaging portion 16A having a V-shaped configuration in cross section.

Figure 3:
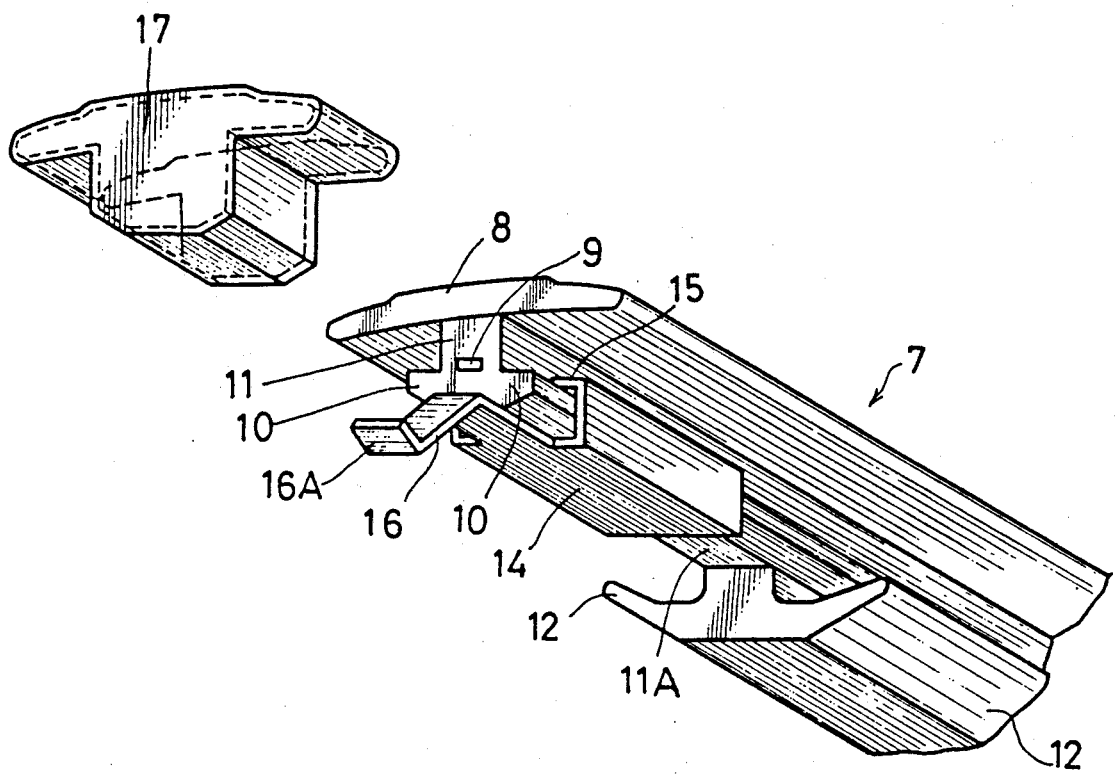
FIG. 3 is a perspective view of the roof molding provided with the clip.
Figure 4:
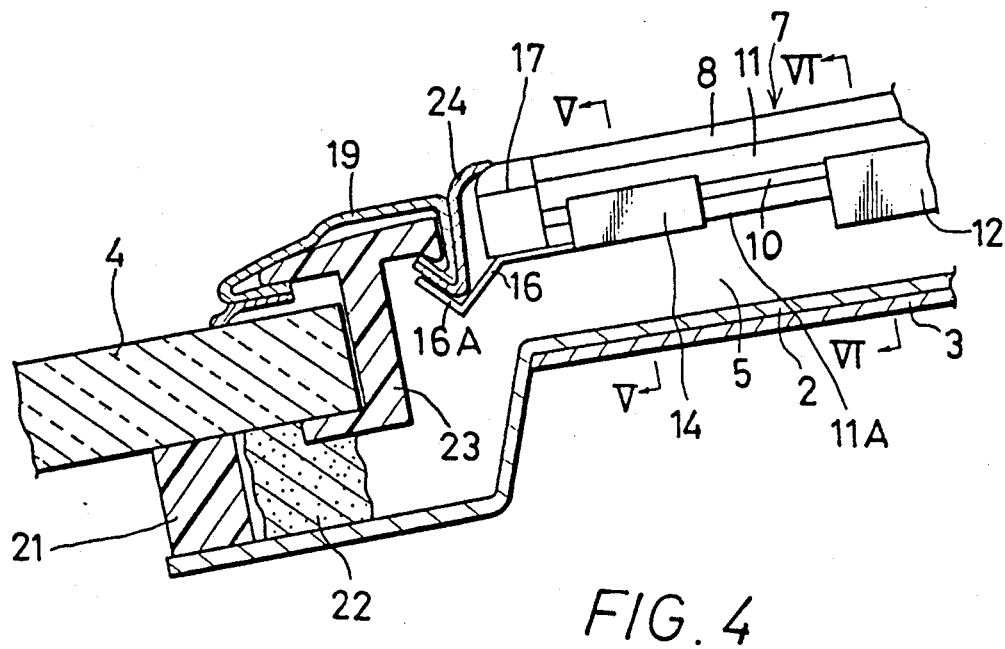
FIG. 4 is a sectional view of the roof molding mounted on an automobile roof.

As shown on FIG. 3, the roof molding 7 is assembled with clips 14 at the clip engaging surfaces 11A of the base member by engaging the projections 15 with the flanged portions 10 of the base member 11. The clips 14 are secured to the clip engaging surfaces 11A by crimping the projections 15 thereto after desired positioning procedure thereof. Subsequently, as shown in FIGS. 3 and 4, the both ends of the roof molding 7 are bonded to end pieces or end caps 17 with an adhesive material. Each of the end caps 17 is formed of a synthetic resin and has a configuration which effectively cover the end surface of the top member 8 and the base member 11 of the roof molding 7.

Figure 5:
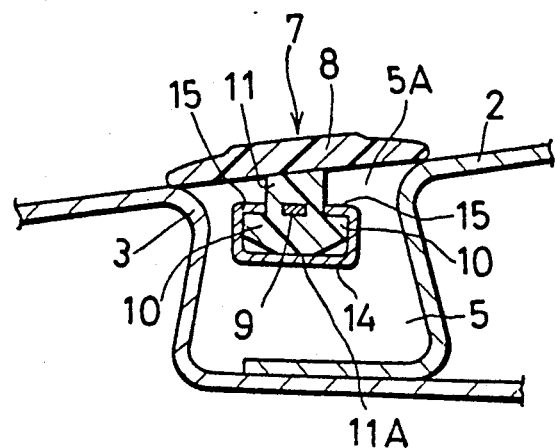
FIG. 5 is a sectional view taken along the line V—V of FIG. 4.
Figure 6:
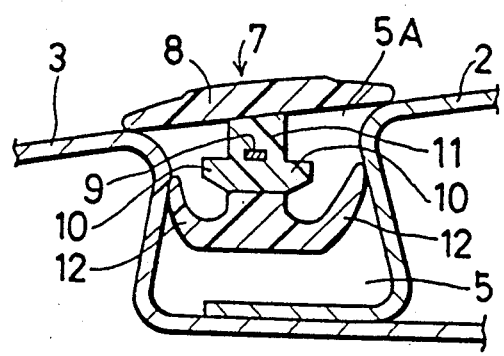
FIG. 6 is a sectional view taken along the lines VI—VI of FIG. 4.
Figure 8:
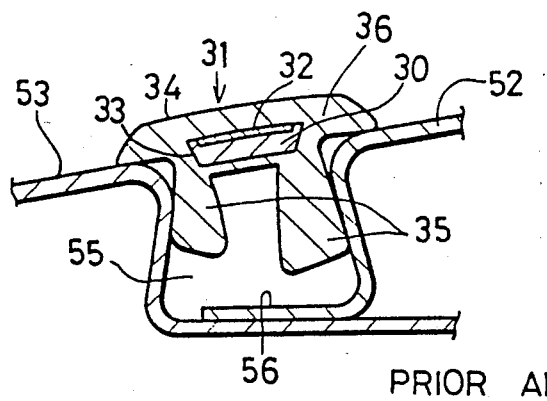
FIG. 8 is a sectional view of a conventional roof molding mounted on the automobile roof.
Figure 9:
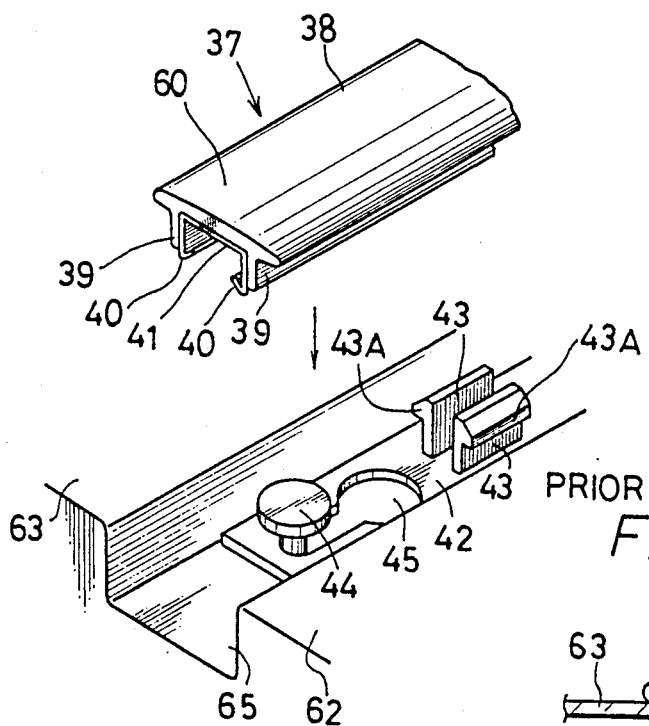
FIG. 9 is a perspective view of another conventional roof molding and clips positioned in a fitting groove.
Figure 10:
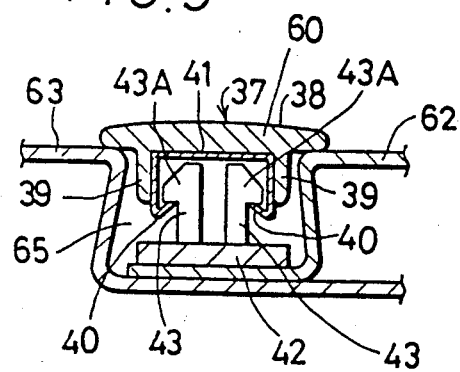
FIG. 10 is a sectional view of the roof molding and clips assembled to each other.

The forward end of the groove 5 is constructed generally as shown in FIGS. 4 to 7. As shown in FIG. 4, the end portion of the roof panel 2 is seated with a front window shield 4 with a spacer 21 and a sealing material 22. The circumferential edge of the window shield 4 is provided with a window molding 19 having a molding clip 23, whereby a part of the window molding 19 is projected into the forward end portion of the groove 5. As will be appreciated, the rearward end of the groove 5 is constructed in the same way. The opening 5A of the groove 5, as shown in FIGS. 5 and 6, has a width smaller than that of the bottom portion of the groove 5.

The roof molding 7 is assembled into the groove 5, as shown FIGS. 4 to 6. When the roof molding 7 is laid on the groove 5, the leg members 12 are resiliently urged to abut on the side walls of the groove 5, whereby the molding 7 is supported in the groove 5 to enable the top member 8 to effectively cover the opening 5A of the groove 5 (FIG. 6). Also, the engaging portion 16A of the engaging strip 16 is snap-interfitted with the window molding 19 to secure the forward end portion of the molding 7 in the groove 5 (FIG. 4). As best shown in FIG. 4, a sealing piece 24 is inserted between the window molding 19 and the end cap 17 to seal the gap formed therebetween. As will be appreciated, since the rearward end portion of the molding is secured in the groove 5 in the same way, the explanation thereof will be omitted.

The preferred embodiment herein described are intended to be illustrative of the inventions and not to limit the inventions to the precise form herein described. They are chosen and described to explain the principles of the invention and their application and practical use to enable others skilled in the art to practice the invention. Accordingly, the engaging strip 16A of the engaging strip 16 may be engaged with a different existing member other than the window molding 19.

What is claimed is:

1. A roof molding to be fitted in a groove formed along a joint line joining a roof panel to a roof side panel of an automobile said groove having side walls, comprising:

a top member to cover said groove;
   a base member formed on the lower surface of said top member, said base member having a reinforcement member embedded therein and having flanged portions formed on both sides thereof;
   resilient leg members connected to said base member, said leg member being transversely oppositely projected relative to each other so as to contact the side walls of said groove, said leg member being omitted at both end portions of said base member to form clip engaging surfaces thereon; and
   clips secured to said clip engaging surfaces of said base member.

2. The roof molding as defined in claim 1, wherein said top member is formed of hard resin.

3. The roof molding as defined in claim 1, wherein said top member is formed of soft resin.

4. The roof molding as defined in claim 3, wherein said leg members are formed of soft resin.

5. The roof molding as defined in claim 4, wherein said top member said base member and said leg members are integrally formed.

6. The roof molding as defined in claim 5 further comprising end caps bonded to said top member and said base member.

7. A clip for securing the end portion of a roof molding in a groove formed along a joint line joining a roof panel to a roof side panel of an automobile said groove having side walls, wherein said roof molding comprises a top member to cover said groove; a base member formed on the lower surface of said top member, said base member having a reinforcement member embedded therein and having flanged portions formed on both sides thereof; and resilient leg members connected to said base member, said leg members being transversely oppositely projected relative to each other so as to contact the side walls of said groove, said leg members being omitted at both end portions of said base member to form clip engaging surfaces thereon, comprising:

a main body having a plurality of projections engageable with said flanged portions; and an engaging strip formed on said main body and extending outwardly therefrom so as to engage a desired existing member positioned in said groove.

8. The clip as defined in claim 7, wherein said engaging strip being configured to engage a part of a window molding.

* * * * *